United States Patent [19]
Markusch et al.

[11] Patent Number: 5,851,261
[45] Date of Patent: Dec. 22, 1998

[54] PROCESS FOR THE PRODUCTION OF POLYUREA ENCAPSULATED FERTILIZER PARTICLES AND THE ENCAPSULATED FERTILIZER PARTICLES PRODUCED BY THIS PROCESS

[75] Inventors: Peter H. Markusch, McMurray, Pa.; Robert L. Cline, Paden City, W. Va.

[73] Assignee: Bayer Corporation, Pittsburgh, Pa.

[21] Appl. No.: 777,426

[22] Filed: Dec. 30, 1996

[51] Int. Cl.⁶ .................................................. C05G 5/00
[52] U.S. Cl. ............................. 71/64.07; 71/64.11
[58] Field of Search ............................. 71/64.07, 64.11

[56] References Cited

U.S. PATENT DOCUMENTS

| | | | |
|---|---|---|---|
| 4,219,589 | 8/1980 | Niks et al. | 71/64.07 |
| 4,804,403 | 2/1989 | Moore | 71/28 |
| 5,374,292 | 12/1994 | Detrick et al. | 71/28 |
| 5,399,186 | 3/1995 | Derrah et al. | 71/64.07 |
| 5,547,486 | 8/1996 | Detrick et al. | 71/28 |
| 5,574,123 | 11/1996 | Bock et al. | 528/45 |
| 5,645,624 | 7/1997 | Naka et al. | 71/64.07 |

FOREIGN PATENT DOCUMENTS

| | | |
|---|---|---|
| 005302 | 11/1979 | European Pat. Off. . |
| 716057 | 11/1995 | European Pat. Off. . |
| 1680680 | 9/1991 | Russian Federation ............. 71/64.07 |
| 91/10362 | 7/1991 | WIPO . |
| 93/06941 | 4/1993 | WIPO . |

OTHER PUBLICATIONS

Database WPI, Section Ch, AN 85–008911, XP002064478 & JP 63 313 704A (Daiichi Kogyo Seiyaku Co. Ltd.) Dec. 21, 1988.
Database WPI, Section Ch, AN 96–500887, XP002064479 & JP 08 257 394 A (Mitsui Toatsu Chem Inc.), Oct. 8, 1996.

*Primary Examiner*—Wayne Langel
*Attorney, Agent, or Firm*—Joseph C. Gil; N. Denise Brown

[57] ABSTRACT

This invention relates to a process for the production of polyurea encapsulated fertilizer particles. These are produced by applying an isocyanate-reactive component which contains at least two amine groups to fertilizer particles to form amine coated particles, and applying a polyisocyanate component to the amine coated particles to form polyurea coated particles. These steps may optionally be repeated in successive order. The resultant polyurea encapsulated fertilizer particles contain from about 0.5 to 15% by weight of polyurea, based on the total weight of the encapsulated fertilizer particles. Instead of using an amine group containing isocyanate-reactive component, water can be applied first.

7 Claims, No Drawings

5,851,261

PROCESS FOR THE PRODUCTION OF POLYUREA ENCAPSULATED FERTILIZER PARTICLES AND THE ENCAPSULATED FERTILIZER PARTICLES PRODUCED BY THIS PROCESS

BACKGROUND OF THE INVENTION

This invention relates to a process for producing encapsulated fertilizers based on polyureas. This process comprises applying at least one coat of an isocyanate-reactive component which contains at least two amine groups to fertilizer particles, and applying at least one coat of an organic polyisocyanate to fertilizer particles, thus forming polyurea encapsulated fertilizer particles. The present invention also relates to the polyurea encapsulated fertilizer particles produced by this process.

Commercial particulate fertilizers are produced and marketed in several different particle types, i.e., granular, pelletized, dusts, pilled, and prilled fertilizers. Also, they may be formed of inorganic substances, organic substances, or combinations thereof. The improvements of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements such as, for example, calcium, boron, magnesium, zinc, chlorine, etc. Such particular fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The improvements of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361. The present invention provides additional improvements in the construction of particulate fertilizers which render them highly attrition resistant, and further extend release properties.

A number of slow release coatings for particular fertilizers have previously been proposed. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating making it necessary to apply a sealant coating, which is composed of a mixture of 30% polyethylene resin in a 70% bright stock mineral oil.

Coatings in which preformed polymer resins are applied from solvents have been described in, for example, U.S. Pat. Nos. 3,475,154 and 3,264,089. The use of solvents creates a vapor hazard as the products are dried and the solvent evaporation step can result in pinhole imperfections in the coatings when applied.

U.S. Pat. No. 4,369,055 has tried to facilitate degradation of coating materials while maintaining the function for controlling the dissolving-out rate by dispersing inorganic powders such as sulfur and talc in a low molecular weight olefin polymer. However, the disclosed coating materials are not completely degraded and thus remain intact in the soil.

Polyurethane coatings as disclosed in U.S. Pat. Nos. 4,711,659 and 4,969,947 require that the substrate contains a minimum quantity of reactive $—NH_2$ groups. Thus, these are not applicable to all fertilizer compositions for which slow release properties may be desirable.

Canadian Patent Application No. 2,135,788 relates to coating fertilizer compositions with at least two types of coating materials wherein the two coating materials have different dissolving-out rates and moisture permeability in a multi-layer structure.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. An outer coating is also necessary. The outer coating consists essentially of an organic wax having a drop melting point of between 50° and 120° C. This outer coating of wax results in coated fertilizer particles which are hydrophobic.

Advantages of the present invention include a fast rate of reaction and lower curing temperatures of the polyureas. This enables faster production rates of encapsulated fertilizer particles at a lower fuel consumption. The polyurea encapsulated fertilizer particles of the present invention are inherently hydrophobic, and thus provide an easier means of controlling the release of fertilizer than by applying a separate, additional, hydrophobic (e.g., wax) coating layer. Also, due to the enhanced hydrophobicity of polyureas vs. polyurethanes, usually an overall lower amount of organic coating is necessary to achieve desirable time release properties. Finally, polyureas are known to be non-biodegradable, which means that substantially less aromatic amine (one of the possible urethane degradation products), which could be potentially hazardous, would be expected to be formed when the fertilizer pellet expires in the soil.

SUMMARY OF THE INVENTION

This invention relates to a process for the production of polyurea encapsulated fertilizer particles. This process comprises 1) applying a) an isocyanate-reactive component which contains at least two amine groups to fertilizer particles to form amine coated fertilizer particles; and 2) applying b) an organic polyisocyanate component onto the amine coated fertilizer particles from step 1) to form polyurea encapsulated fertilizer particles. These two steps are optionally repeated (successively) as many times as necessary, with the polyurea encapsulated fertilizer particles from step 2) being substituted for the fertilizer particles in step 1), until the desired thickness of the polyurea coating which encapsulates the fertilizer particles is obtained. The resultant polyurea encapsulated fertilizer particles contain from about 0.5 to 15%, preferably 1 to 10%, most preferably 3 to 7% by weight of polyurea, based on the total weight of the encapsulated fertilizer composition.

In the above process, it is preferred that the amine group containing isocyanate-reactive component a) which is first applied to the fertilizer particles in step 1) is present as a liquid component. However, the amine group containing isocyanate-reactive component a) which is applied to the particles subsequently to form additional layers may be present as a gaseous component.

Another embodiment of the present invention comprises 1) applying b) an organic polyisocyanate component to fertilizer particles to form isocyanate coated fertilizer particles; and 2) applying a) an isocyanate-reactive component which contains at least two amine groups onto the isocyanate coated fertilizer particles from step 1) to form polyurea encapsulated fertilizer particles. In this embodiment, the isocyanate-reactive component which contains amine groups may be optionally present as a gaseous component. Such a gaseous component can be applied by contacting the fertilizer particles with the volatilized amine group containing component. In this embodiment, it is preferred that the amine group containing isocyanate-reactive component is a gaseous component. These two steps are optionally repeated (successively) as many times as necessary, with the polyurea encapsulated fertilizer particles from step 2) being substituted for the fertilizer particles in step 1), until the desired thickness of the polyurea coating which encapsulates the fertilizer particles is obtained. The resultant polyurea encapsulated fertilizer particles contain from about 0.5 to 15%, preferably 1 to 10%, most preferably 3 to 7% by weight of polyurea, based on the total weight of the encapsulated fertilizer composition.

In another embodiment of the present invention, this process comprises 1) sparsely applying a) water to fertilizer particles to form water coated fertilizer particles, immediately followed by 2) applying b) an organic polyisocyanate component onto the water coated fertilizer particles from step 1), thereby forming polyurea encapsulated fertilizer particles. In this embodiment, the water may be present as a liquid component or as a gaseous component. When present as a gaseous component, the water is applied to the fertilizer particles by contacting the particles with steam. These two steps are optionally repeated (successively) as many times as necessary to form the desired thickness of polyurea coating which encapsulates the fertilizer particles. The resultant encapsulated fertilizer particles contain from about 0.5 to 15%, preferably 1 to 10%, most preferably 3 to 7% by weight of polyurea, based on the total weight of the polyurea encapsulated fertilizer particles.

The present invention is also directed to a process comprising 1) applying b) an organic polyisocyanate component to fertilizer particles to form isocyanate coated fertilizer particles, immediately followed by 2) sparsely applying a) water onto the isocyanate coated fertilizer particles from step 1), thereby forming polyurea encapsulated fertilizer particles. In this embodiment, the water may be present as a liquid component or as a gaseous component. When present as a gaseous component, the water is applied to the fertilizer particles by contacting the particles with steam. These two steps are optionally repeated (successively) as many times as necessary to form the desired thickness of polyurea coating which encapsulates the fertilizer particles. The resultant encapsulated fertilizer particles contain from about 0.5 to 15%, preferably 1 to 10%, most preferably 3 to 7% by weight of polyurea, based on the total weight of the polyurea encapsulated fertilizer particles.

It is also preferred that the organic polyisocyanate comprises an aromatic polyisocyanate, more preferably polymethylene poly(phenyl isocyanate), regardless of which specific embodiment described above is followed.

The present invention also relates to polyurea encapsulated fertilizer particles produced by any of the above processes.

DETAILED DESCRIPTION OF THE INVENTION

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula $$R(NCO)_2$$

in which R represents an organic group obtained by removing the isocyanate groups from an organic diisocyanate having a molecular weight of about 56 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4tetramethylene diisocyanate, 1,6-hexamethylene diisocyanate, 2,2,4trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4isocyanatocyclohexyl)methane, 2,4'-dicyclohexylmethane diisocyanate, 1,3- and 1,4-bis (isocyanatomethyl)cyclohexane, bis(4-isocyanato-3-methyl-cyclohexyl)methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'-and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates for the present invention are aromatic polyisocyanates. Some examples of suitable aromatic polyisocyanates are 1,3- and/or 1,4-phenylene diisocyanate, 2,4-and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly(phenylisocyanates) obtained by phosgenating aniline/formaldehyde condensates may also be used.

It is more preferred that the polyisocyanates for the presently claimed invention are polymethylene poly (phenylisocyanate) compositions having a functionality of from about 2.1 to about 3.5, preferably 2.2 to 3.2 and most preferably of 2.3 to 2.8, and an NCO group content of about 26% to about 33.6%, preferably about 30.5% to about 33%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the composition. The polymeric MDI content of these isocyanates varies from about 10 to about 70% by weight, preferably from about 30% to about 60% by weight.

Polymeric MDI as used herein, refers to three-ring and/or higher ring containing products derived by the phosgenation of aniline-formaldehyde condensation products.

Most preferred polyisocyanates include, for example, polymethylene poly(phenylisocyanate) compositions having an average functionality of from about 2.2 to about 3.2, preferably about 2.3 to about 2.8, an NCO group content of about 26 to 32% by weight, and a monomer content of from about 40 to 80% by weight, wherein the content of monomer comprises no more than about 2% by weight of the 2,2'-isomer, from about 2 to about 25% by weight of the 2,4'-isomer and from about 35 to about 60% by weight of the 4,4'-isomer, based on the entire weight of the blend. This isocyanate composition comprises from about 20 to about 60% by weight of polymeric MDI.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Suitable isocyanate-reactive compounds which contain at least two amine groups include both high molecular weight amine group containing compounds and low molecular weight amine group containing compounds. Low molecular weight amine group containing compounds are preferred in the present invention. The higher molecular weight compounds containing amine groups are less preferred because they usually exhibit higher viscosity and result in lesser hydrophobicity of the polyurea encapsulant.

Suitable amine-terminated polyethers according to the invention include polymers containing aromatically bound isocyanate-reactive primary or secondary (preferably primary) amino groups and/or aliphatically bound isocyanate-reactive primary or secondary amino groups. These compounds have relatively high molecular weights molecular weights ranging from greater than about 500 to 12,000. High molecular weight amine group containing compounds are less preferred in the present invention.

Among the suitable amine terminated polyethers are included, for example, those containing primary or secondary (preferably primary) aromatically or aliphatically (preferably aliphatically) bound amino groups, wherein amino end groups can also be attached to the polyether chain through urethane or ester groups.

It is also possible that mixtures of higher functional amine group containing compounds and lower functional amine group containing compounds can be used to assure that the average functionality of the blend is less than about 4. Compounds containing amino end groups can also be attached to the polymer chain through urethane or ester groups. Useful amine-terminated polymers are liquids at room temperature and have viscosities of less than about 20,000 mPa.s at 25° C.

Suitable high molecular weight and low molecular weight amine-terminated polyethers can be prepared by any of several methods known in the art. Since most of these methods use hydroxyl-functional polyethers as starting materials, the reactions do not necessarily have to be taken to completion in order to provide amine-terminated polyethers of the present invention, i.e., polyethers having at least two isocyanate reactive groups and a molecular weight within one of the ranges identified above, in which at least 50% of the isocyanate reactive groups are primary and/or secondary amino groups.

Suitable low molecular weight isocyanate-reactive compounds which contain at least two amine groups typically have molecular weights of from about 32 to about 500. These preferably contain from about 2 to about 6 (preferably 2 to 4, most preferably 2) amino groups.

Suitable amine-terminated polyethers according to the invention include polymers containing aromatically bound isocyanate-reactive primary or secondary (preferably primary) amino groups and/or aliphatically bound isocyanate-reactive primary or secondary amino groups. These compounds have relatively low molecular weights ranging from about 32 to 500.

Among the suitable amine terminated polyethers are included, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

Other low molecular weight amine group containing compounds suitable for the relatively low molecular weight component according to the invention include organic primary amines and secondary amines such as, for example, ammonia, ethylene diamine, diethylenetriamine, triethylenetetramine, 1,3-diamino-propane, 1,3-diaminobutane, 1,4-diaminobutane, isophorone-diamine, 2-methyl-1,5-pentane diamine, diamino-cyclohexane, hexamethylenediamine, methyliminobis-(propylamine), iminobis(propylamine), bis(aminopropyl)piperazine, aminoethyl piperazine, bis-(p-aminocyclohexyl)-methane, mixtures thereof, and the like.

Other suitable amines include, for example,1,8-p-diaminomenthane, bis(4-amino-3-methylcyclohexyl) methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl) propane, 1,1-bis(4-aminocyclohexyl)ethane, 1,1-bis(4-aminocyclohexyl)butane, 2,2-bis(4-aminocyclohexyl) butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

Other suitable amines to be used for the relatively low molecular weight component in the present invention include, for example, aromatic diamines such as, for example, 1-methyl-3,5-diethyl-2,4-diamino benzene, 1-methyl-3,5-diethyl-2,6-diamino benzene, 1,3,5-trimethyl-2,4-diamino benzene, 1,3,5triethyl-2,4-diamino benzene, 3,5,3',5'-tetraethyl4,4'-diamino diphenylmethane, 3,5,3',5'-tetraisopropyl4,4'-diamino diphenyl-methane, 3,5-diethyl-3',5'-diisopropyl4,4'-diamino diphenyl-methane, 3,3'-diethyl-5,5'-diisopropyl-4,4'-diamino diphenyl-methane, 1-methyl-2,6-diamino-3-isopropylbenzene and mixtures of the above diamines, such as, for example, mixtures of 1-methyl-3,5-diethyl-2,4-diamino benzene and 1-methyl-3,5-diethyl-2,6-diamino benzene.

Low molecular weight amine group containing compounds which are isocyanate-reactive are preferred in the present invention. This is due to the ability to apply these low molecular weight amine group containing compounds by contacting the fertilizer particles with the volatilized amine. Applying the amine in the gaseous state provides a more uniform coverage of the amine on the particle and thus, a more uniform coating on its surface.

It is also possible to include other additives in either the isocyanate-reactive component or the polyisocyanate component prior to applying the component to the fertilizer particles. Possible additives include, for example, flow aids, surfactants, defoamers and other additives known to those skilled in the art. Any additive which aids the formation of the polyurea coating which encapsulates the fertilizer particles may be included in one or both of these components. It is, however, preferred that no additives are included in either of the two components.

Suitable fertilizer particles for the present encapsulation process include any of the known chemical fertilizers. Some examples are ammonium sulfate, ammonium nitrate, urea sodium nitrate ammonia phosphate, potassium phosphate, and combinations thereof. These fertilizer particles are, obviously, water soluble. In the present application, it is not necessary for the fertilizer particles to contain a minimum amount, such as at least 10% by weight, of, for example, reactive functional groups such as $NH_2$ groups to enable the coating to adhere to the fertilizer particles.

As used herein, the phrase "fertilizer particles" refers to any of the commercially particulate fertilizers which are produced and marketed in various particle types, i.e., granular, pelletized, dusts, pilled, and prilled fertilizers.

An attrition resistant, controlled release particulate fertilizer may be prepared by applying the isocyanate-reactive component and the polyisocyanate to fertilizer particles, and, optionally, heated to a temperature of between about 60° and 105° C. Due to the fast speed of reaction of the isocyanate with the amine, it is possible to cure the polyurea at substantially lower temperatures. The fertilizer particles are kept in continuous low shear, low impact, motion relative to each other by mixing apparatus. Examples of suitable mixing apparatus include fluid bed, rotating drum, pan pelletizer, and any others which can provide a continuous, low shear motion of the fertilizer particles.

More specifically, attrition resistant, controlled release fertilizers may be produced by (a) providing a quantity of fertilizer particles and, optionally, heating them to a temperature no higher than about 120° C., (b) agitating the fertilizer particles such that a gentle mixing thereof is maintained, (c) adding to the agitated fertilizer particles an isocyanate-reactive component which contains at least amine groups as described above, (d) after the isocyanate-reactive component has spread uniformly, adding to the agitated fertilizer particles a polyisocyanate component, in an amount such that the ratio of NCO groups to amine groups is from about 2.0:1 to about 0.8:1, preferably 1.5:1 to 0.9:1, most preferably 1.2:1 to 1.0:1, (e) allowing the polyisocyanate and the isocyanate-reactive materials to react, thus forming a solidified polyurea coating on the fertilizer particles, and (f), if necessary, cooling the coated fertilizer particles to about or slightly above room temperature, with continuous agitation.

Metering of the streams of the polyisocyanate component and the isocyanate-reactive component onto the fertilizer particles can be done simultaneously. It is, however, advantageously discontinuous, when only a portion of the total amount of each of the two reactants being added and is allowed to react prior to applying additional portions. This is, however, only possible when the reactivity of the amine and isocyanate is sufficiently low enough to allow thorough mixing of the two components.

Successful application of the coatings of the present invention to particulate fertilizers depends on i) continuous non-shear movement of fertilizer particles during application of the components forming the polyurea coatings. It is very important to maintain movement of the particles to assure continuous coatings and to avoid agglomeration of the fertilizer particles.

It is not necessary for the fertilizer particles to contain reactive groups for adhesion of the coating material, and only a very minute portion of the reactive groups in the fertilizer particles containing them are actually exposed on the surface, and these reactive groups are in a solid phase which does not readily react with the liquid isocyanate component. In the embodiment wherein water is applied in the first step instead of an amine group containing isocyanate-reactive component, it is necessary to use caution so that the water soluble plant nutrients of the fertilizer particles are not dissolved. Thus, it is recommended that the water be applied sparsely to the fertilizer particles by, for example, steaming or misting in a finely divided spray. This should immediately be followed by applying the polyisocyanate which forms the polyurea due to reaction between the water with the NCO groups of the polyisocyanate. It is preferred in the case when the polyisocyanate is applied first, the water should be applied in the form of steam. In both of these embodiments, these two steps may optionally be repeated as many times as necessary to attain the desired coating thickness of polyurea on the fertilizer particles. The final product should contain from 0.5 to 15% by weight of polyurea, based on the total weight of the final product.

As used herein with respect to the embodiment wherein water is applied to the fertilizer particles, the term sparsely refers to, for example, steaming or misting water in a finely divided spray onto the fertilizer particles. Since the plant nutrients of the fertilizer particles are water soluble, care must be taken to avoid dissolving these nutrients when water is applied to the fertilizer particles, and particularly when water is applied first in this process. When water is been applied to the fertilizer particles first, the polyisocyanate should be applied immediately to prevent the nutrients from dissolving.

It is, of course, also possible that both water and amine group containing isocyanate-reactive components may be used alternately to react with the polyisocyanate component in forming polyurea encapsulated fertilizer particles. Such embodiments are a combination of the process wherein an amine group containing compound is used as the isocyanate-reactive component and wherein water is used as the isocyanate-reactive component.

For example, when applying the polyisocyanate first to the fertilizer particles, it is then possible to apply an isocyanate-reactive component which is selected from the group consisting of gaseous amine, water and steam to the isocyanate coated fertilizer particles, then applying another layer of polyisocyanate, then applying another layer of an isocyanate-reactive component selected from the group consisting of gaseous amine, liquid amine, steam and water, and so on. Successive layers of isocyanate-reactive component are also selected from the group consisting of gaseous amine, liquid amine, steam and water. These steps can optionally be repeated successively until the desired thickness of polyurea encapsulating the fertilizer particles is attained as described above.

It is also possible that the isocyanate-reactive component be applied to the fertilizer particles first. In such an embodiment, the isocyanate-reactive component being applied to the fertilizer particles in the first step is selected from the group consisting of a liquid amine group containing compound and steam. This is followed by applying a polyisocyanate component to the amine or steam coated fertilizer particles. Next, another layer of isocyanate-reactive component is applied to the particles. This layer of isocyanate-reactive component is selected from the group consisting of a liquid amine, a gaseous amine, water and steam. Then, another layer of a polyisocyanate component is applied, and so on. Successive layers of isocyanate-reactive component are selected from the group consisting of a liquid amine, a gaseous amine, water and steam. These steps are optionally repeated successively as many times as necessary to attain the desired thickness of polyurea which encapsulates the fertilizer particles as described above.

The following examples further illustrates details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

In this example, n-hexane and methylene chloride were used as carrier solvents to more easily apply the coating to the fertilizer granules. It is preferred to apply the components neat, using no carrier solvent on an industrial scale.

Granules of Agway 5-10-10 fertilizer (100 g) were charged into a 1000 ml flask and the flask attached to a rotary evaporator. The flask was rotated above a 50° C. water bath and evacuated using an aspirator (about 60 Torr).

An amine solution was prepare by diluting 1.45 g of an amine terminated 400 molecular weight polypropyleneoxide polyether (Jeffamine D-400, commercially available from Huntsman), and 13.05 g. of n-hexane (the carrier solvent). This amine solution was applied onto the fertilizer granules by using vacuum to pull the solution into the flask by means of the tubing/stopcock device.

In order to assure complete transfer of the amine solution into the flask containing fertilizer granules, two additional n-hexane portions (of 10 g. each) were added through the charging tube in order to flush it.

The rotating flask was slowly lowered into the 50° C. water bath. The n-hexane was removed from the rotating flask by vacuum distillation (60 Torr) which left the amine coated on the surface of the fertilizer granules. However, some of the amine was also on the wall of the flask.

An isocyanate solution was prepared using 2 g. of a polymeric MDI prepolymer. This prepolymer was prepared by the following procedure:

A dry vessel was charged with 41.15 parts of a polymeric isocyanate prepared by phosgenation of an aniline-formaldehyde condensate (having an NCO content of 31.4% and a viscosity of 204 mPa.s) which contained 38.1% by weight of 4,4'-diphenylmethane diisocyanate and 1.8% by weight of 2,4'-diphenylmethane diisocyanate, and 60.1% by weight of higher functional polymeric isocyanates of the MDI series, and 17.64 parts of a polymeric isocyanate prepared by phosgenation of an aniline-formaldehyde condensate (having an NCO content of 32.29% and a viscosity of 42 mPa.s) which contained 2.33% by weight of 2,2'-diphenylmethane diisocyanate, 44.59% by weight of 4,4'-diphenylmethane diisocyanate, and 17.16% by weight of 2,4'diphenylmethane diisocyanate and 35.92% by weight of higher functional polymeric isocyanates. The mixture of polymeric isocyanates was heated to 45° C. While stirring continuously, 20.61 parts each of polypropylene glycol (having an average MW of 2000 and an OH number of 56) and polypropylene tetraol (having an average molecular weight of 3600 and an OH number of 62) were added to the reaction vessel containing the polymeric isocyanate mixture. The mixture was blanketed with dry nitrogen, heated to a temperature of 70°–80° C., and kept within this temperature range for 3–4 hours. The resultant MDI prepolymer had an NCO content was 16.65% and the viscosity was 5,950 mPa.s at 25° C.

A solution of this MDI prepolymer was prepared by diluting 2 g of it with 18 g. of methylene chloride (the carrier solvent). This solution was applied onto the fertilizer granules in the rotating flask in the same manner which the amine was deposited. To assure complete transfer of the isocyanate, two additional methylene chloride flushes (of 10 g each) were added through the charging tube. After vacuum removal of the methylene chloride, polyurea coated fertilizer granules were obtained.

This procedure was repeated two (2) more times, using the same amount of amine and isocyanate co-reactants. Theoretically, this would result in an 9.38% by weight polyurea encapsulation, based on the total weight of the encapsulated fertilizer. However, the actual amount was about 6.8% by weight. This was due to the fact that polyurea was also coated on the walls on the inside of the flask.

The polyurea encapsulated fertilizer granules were tested for slow release properties in comparison with unmodified fertilizer granules using the following test procedure:

20 g. of fertilizer particles were combined with 80 g. of water and stored at room temperature in a closed jar for about 20 hours. After this time, the solids were filtered off and the amount of solids in the aqueous phase was determined after evaporation of water for 4 hours in a 100° C. oven.

In the case of Example 1, the amount of fertilizer dissolved from the polyurea encapsulated fertilizer was 0.11 g. of 0.6% by weight. By comparison, in the case of the unmodified fertilizer, the amount of dissolved fertilizer was determined to be 6.60 g. or 33% by weight. This means that only about 1.8% by weight of the water soluble fertilizer was released from the polyurea encapsulated fertilizer in comparison with the unmodified sample using identical water exposure conditions.

Example 2

In this example, methylene chloride was used as a carrier solvent to more easily apply the coating to the fertilizer granules. It is preferred to apply the components neat, using no carrier solvent on an industrial scale.

100 g granules of Agway 5-10-10 fertilizer were charged into a 1000 ml flask and the flask attached to a rotary evaporator. The flask was rotated above a 50° C. waterbath and evacuated using an aspirator (about 60 Torr).

A solution of polyisocyanate was formed by diluting 2 g of a polyphenyl polymethylene polyisocyanate containing 4,4'-diphenylmethane diisocyanate and about 55% of higher functionality homologs having an isocyanate group content of about 32.3% and a viscosity of about 156 mPa.s at 25° C., with 10 g of methylene chloride (the carrier solvent). The isocyanate-methylene chloride solution was applied onto the fertilizer granules by using vacuum to pull the solution into the flask by means of the tubing/stopcock device.

To assure complete transfer of the polyisocyanate into the flask containing the fertilizer pellets, two additional methylene chloride flushes (10 g each) were added through the charging tube.

The rotating flask was lowered into the 50° C. waterbath. The methylene chloride was removed from the rotating flask by vacuum distillation which left the isocyanate coated on the surface of the fertilizer granules (some, however, also on the wall of the flask).

Next, ethylene diamine (about 100 g) was charged into a 500 ml, 3-neck flask. The vacuum tube from the rotary evaporator was connected to the flask (the end of the vacuum tube was positioned just above the ethylene diamine liquid). The other end of the tube was extended to the bottom of the 1000 ml flask (rotated in 50° C. waterbath) containing the isocyanate coated fertilizer. A nitrogen hose was connected to the 500 ml flask containing the ethylene diamine. The other neck was sealed with a glass stopper. Vacuum (60 Torr) was pulled on the entire system. The vacuum was adjusted to 560–610 Torr by nitrogen that was connected to the ethylene diamine containing flask. This allowed the ethylene diamine vapors to be carried by the nitrogen to the isocyanate coated fertilizer. Ethylene diamine gas flow was continued for about 30–40 minutes. About 1.0 g of ethylene diamine gas was transferred to the 1000 ml flask that contained the isocyanate coated fertilizer granules. 0.46 g of amine was needed for complete reaction with the isocyanate to make the polyurea coating.

The above procedure was repeated two more times, using the same quantities of isocyanate and amine gas. Theoretically, this would result in about 6.87% polyurea encapsulation on the fertilizer granules. However, the actual amount was 5.82% due to the loss of polyurea on the wall of the flask.

The polyurea encapsulated fertilizer granules were tested for slow release properties in comparison with unmodified fertilizer granules using the following procedure:

20 g of the fertilizer were combined with 80 g of water and stored at room temperature in a closed glass jar for 20 hrs. After this time, the solids were filtered off and the amount of solids in the aqueous phase was determined after evaporation of the water for 4 hours in a 100° C. oven.

In the case of Example 2, the amount of dissolved fertilizer from unmodified fertilizer granules was determined to be 6.5 g or 32.5%. The amount of dissolved fertilizer from the polyurea encapsulated fertilizer granules was determined to be 3.5 g or 18.6%. This means that only about 57% of the water soluble fertilizer was released from the polyurea encapsulated fertilizer in comparison with the unmodified fertilizer granules using the same water exposure conditions.

Example 3

In this example, methylene chloride was used as a carrier solvent to more easily apply the coating to the fertilizer granules. It is preferred to apply the components neat, using no carrier solvent on an industrial scale.

100 g granules of Agway 5-10-10 fertilizer were charged into a 1000 ml flask and the flask attached to a rotary evaporator. The flask was rotated above a 50° C. waterbath and evacuated using an aspirator (about 60 Torr).

A polymeric MDI prepolymer was prepared by charging 282 parts of a phosgenated amine-formaldehyde condensate containing less than 0.1% of the 2,2'-isomer, 47–48% of the 4,4'-isomer and 2–3% of the 2,4'-isomer and about 50% of higher functional polymeric isocyanates to a dry reaction vessel. With continuous stirring, 100 parts each of polypropylene glycol (average molecular weight 2000, OH number=56) and polypropylene tetraol (average molecular weight 3600, OH number=62, and prepared by the propoxylation of ethylene diamine) were added to the reaction vessel at room temperature. The mixture was blanketed with dry nitrogen and heated to a temperature of 80°–88° C. The mixture was kept within this temperature range until the measured NCO content was at or slightly below the theoretical value (about 2–4 hours). The prepared prepolymer had a viscosity of about 8500 mPa.s at 25° C., a final NCO group content of about 15.5% (theoretical NCO content 16%).

A solution of this prepolymer was formed by diluting 2 g of the isocyanate prepolymer with 10 g of methylene chloride. The isocyanate-methylene chloride solution was applied onto the fertilizer granules by using vacuum to pull the solution into the flask by means of a tubing/stopcock device.

To assure complete transfer of the polyisocyanate into the flask containing the fertilizer granules, two additional methylene chloride flushes (10 g each) were added through the charging tube.

The rotating flask was lowered into the 50° C. waterbath. The methylene chloride was removed from the rotating flask by vacuum distillation which left the isocyanate coated on the surface of the fertilizer granules (some, however, also was on the wall of the flask).

The granules were transferred to a cylinder (20 cm in length and 5 cm in diameter, with about 100 small holes). The cylinder was rotated in steam (over a pan of boiling water) for 30 minutes. The granules were removed and charged back into the 1000 ml flask.

The above procedure was repeated using the same amount of isocyanate. Theoretically, this would result in about 4% polyurea encapsulation. However, the actual amount was less due to the loss of isocyanate on the wall of the flask and polyurea coated on the wall of the cylinder. It was later determined that the transfer efficiency (amount of polymer deposited on the fertilizer granules) is only about 60–80%.

The polyurea encapsulated fertilizer granules were tested for slow release properties vs. unmodified fertilizer granules using the following test procedure:

20 g of the fertilizer granules were combined with 80 g of water and stored at room temperature in a closed glass jar for 20 hours. After this time, the solids were filtered off and the amount of solids in the aqueous phase were determined after evaporation of the water for 4 hours in a 100° C. oven.

In the case of Example 3, the amount of dissolved fertilizer was determined to be 5.33 g or 26.7% for unmodified fertilizer granules. For the polyurea encapsulated fertilizer granules, the amount of fertilizer dissolved was 2.57 g or 13.4%. This means that only about 50% of the water soluble fertilizer was released from the polyurea encapsulated fertilizer granules in comparison with the unmodified fertilizer granules using the same water exposure conditions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing encapsulated, slow release, fertilizer particles comprising:
   1) applying a) an isocyanate-reactive component which contains at least two amine groups, to fertilizer particles containing at least one water soluble plant nutrient, to form amine coated fertilizer particles,
   2) applying b) an organic polyisocyanate component onto the amine coated fertilizer particles from step 1) to yield polyurea encapsulated fertilizer particles, and, optionally,
   3) repeating steps 1) through 2) as many times as necessary, wherein the encapsulated fertilizer particles from step 2) are substituted for the fertilizer particles in step 1) above,
   so as to form encapsulated fertilizer particles which contain from about 0.5% to about 15% by weight of polyurea, based on the total weight of the encapsulated fertilizer particles.

2. The process of claim 1, wherein said isocyanate-reactive component is a liquid amine compound which is applied onto the fertilizer particles by spraying.

3. The process of claim 1, wherein said polyisocyanate component is an aromatic polyisocyanate.

4. The process of claim 3, wherein said aromatic polyisocyanate comprises polymethylene poly(phenylisocyanate) having an NCO group content of 30 to 33%, and a monomer content of 30 to 90% by weight, wherein said monomer content comprises from 25 to 65% of the 4,4'-isomer of MDI, from 1 to 20% by weight of the 2,4'isomer of MDI, and no more than 5% by weight of the 2,2'-isomer of MDI.

5. A process for producing encapsulated, slow release, fertilizer particles comprising:
   1) applying b) an organic polyisocyanate component onto fertilizer particles containing at least one water soluble plant nutrient, to form isocyanate coated fertilizer particles, 2) applying a) a gaseous isocyanate-reactive component which contains at least two amine groups, onto the isocyanate coated fertilizer particles from step 1) by contacting the isocyanate coated fertilizer particles with a volatilized amine group containing isocyanate-reactive compound to yield polyurea encapsulated fertilizer particles, and, optionally, 3) repeating steps 1) through 2) as many times as necessary, wherein the encapsulated fertilizer particles from step 2) are substituted for the fertilizer particles in step 1) above, so as to form encapsulated fertilizer particles which contain from about 0.5% to about 15% by weight of polyurea, based on the total weight of the encapsulated fertilizer particles.

6. A process for producing encapsulated, slow release, fertilizer particles comprising:

1) sparsely applying a) water to fertilizer particles containing at least one water soluble plant nutrient, to form water coated fertilizer particles, immediately followed by:

2) applying b) an organic aromatic diisocyanate component which contains isocyanate-groups onto the water coated fertilizer particles from step 1) to yield polyurea encapsulated fertilizer particles, and, optionally, 3) repeating steps 1) through 2) as many times as necessary, wherein the encapsulated fertilizer particles from step 2) are substituted for the fertilizer particles in step 1) above, so as to form encapsulated fertilizer particles which contain from about 0.5% to about 15% by weight of polyurea, based on the total weight of the encapsulated fertilizer particles.

7. A process for producing encapsulated, slow release, fertilizer particles comprising:

1) applying b) an organic aromatic diisocyanate component which contains isocyanate-groups to fertilizer particles containing at least one water soluble plant nutrient, to form isocyanate coated fertilizer particles, immediately followed by:

2) applying a) water onto the water isocyanate coated fertilizer particles from step 1) to yield polyurea encapsulated fertilizer particles, and, optionally, 3) repeating steps 1) through 2) as many times as necessary, wherein the encapsulated fertilizer particles from step 2) are substituted for the fertilizer particles in step 1) above, so as to form encapsulated fertilizer particles which contain from about 0.5% to about 15% by weight of polyurea, based on the total weight of the encapsulated fertilizer particles.

* * * * *